(12) United States Patent
Quere et al.

(10) Patent No.: US 6,923,428 B2
(45) Date of Patent: Aug. 2, 2005

(54) SELF-CLOSING CONNECTING DEVICE AND CONNECTING PIECE THEREFOR

(75) Inventors: Jean-Luc Quere, Bruz (FR); Frédéric Goilot, Rennes (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/475,975

(22) PCT Filed: Apr. 19, 2002

(86) PCT No.: PCT/FR02/01354

§ 371 (c)(1),
(2), (4) Date: Oct. 27, 2003

(87) PCT Pub. No.: WO02/088591

PCT Pub. Date: Nov. 7, 2002

(65) Prior Publication Data

US 2004/0135110 A1 Jul. 15, 2004

(30) Foreign Application Priority Data

Apr. 26, 2001 (FR) .......................................... 01 05653

(51) Int. Cl.$^7$ ................................................. F16L 37/28
(52) U.S. Cl. ................................................. 251/149.6
(58) Field of Search ........................... 251/149.6, 149.7

(56) References Cited

U.S. PATENT DOCUMENTS 2,265,267 A    12/1941  Cowles
5,211,197 A  *  5/1993  Marrison et al. ...... 137/614.04

FOREIGN PATENT DOCUMENTS

| EP | 0 800 031 | 10/1997 |
| EP | 1 182 391 | 2/2002 |
| FR | 2 535 827 | 5/1984 |
| GB | 1 554 660 | 10/1979 |

* cited by examiner

Primary Examiner—Justine R. Yu
Assistant Examiner—Peter deVore
(74) Attorney, Agent, or Firm—Young & Thompson

(57) ABSTRACT

The invention concerns a tubular connection piece for a self-closing connecting device, comprising an end (3) to be connected to a member, externally provided with elements (5) for axially locking it in a housing of the connecting device, and internally equipped with a valve (33) mounted sliding relative to a valve seat (37) between closing and opening positions and a spring (40) interposed between a inner flange (41) of the connection piece and the valve to push the valve into its closing position against the valve seat. The invention also concerns a corresponding connection device.

21 Claims, 2 Drawing Sheets

FIG_1

SELF-CLOSING CONNECTING DEVICE AND CONNECTING PIECE THEREFOR

CROSS REFERENCE TO RELATED APPLICATIONS

This is the 35 USC 371 National Stage of International Application PCT/FR02/01354 filed on 19 Apr. 2002, which designated the United States of America.

FIELD OF THE INVENTION

The present invention relates to an endpiece for a self-closing coupling device and to a corresponding self-closing coupling device. Such a device is for coupling together two elements of a circuit for conveying fluid under pressure, such as coupling pipe ends, or more generally, coupling a fluid receiver member such as a tank to a fluid emitter member such as a pump.

BACKGROUND OF THE INVENTION

Numerous structures are known for coupling devices of this type.

One such coupling device generally comprises a tubular body having an internal channel axially subdivided into a first section arranged to receive in leaktight manner an end of a pipe secured to one of the elements that are to be connected together, and a second section having an endpiece fitted therein which is arranged to enable a coupling to be made subsequently to the other element for connection. Between these two sections of the internal channel, the body generally includes an internal shoulder forming a valve seat arranged to co-operate with a valve slide mounted in the internal channel beside the endpiece so as to slide between a closed position in which the valve slide is pressed in leaktight manner against the valve seat, and an open position in which the valve slide is spaced apart from the valve seat so as to define a passage for the fluid. A spring is conventionally interposed between the valve slide and the endpiece to urge the endpiece into its closed position against the valve seat. The manufacture of such coupling devices raises problems, in particular concerning making the valve seat and also assembling the valve which is done by putting successively into place in the body: the valve slide, the return spring, and the endpiece, and which requires handling that is relatively slow and awkward.

In order to facilitate assembly operations, it is known to make subassemblies that incorporate the valve slide, the return spring, and the valve seat. Assembly is then performed by initially inserting the subassembly into the internal channel of the body, and then inserting the endpiece which serves to secure the subassembly definitively in the body.

OBJECTS AND SUMMARY OF THE INVENTION

The invention seeks to propose a solution that constitutes an alternative to those specified above, serving to simplify assembly of the coupling device.

To this end, the invention provides a tubular endpiece for a self-closing coupling device, which endpiece includes one end for coupling to a member, is provided on the outside with means for preventing it from moving axially in a housing of the coupling device, and is fitted internally with a valve slide mounted to slide relative to a valve seat between a closed position and an open position, a spring being interposed between an internal shoulder of the endpiece and the valve slide in order to urge the valve slide into its closed position against the valve seat.

Thus, the valve seat, the valve slide, the return spring, and the endpiece can be assembled together in a preliminary operation that is simple to perform, thereby providing a subassembly which merely needs to be secured inside the tubular body of the coupling device. As a result, assembly operations become particularly simple and fast.

The invention also provides a self-closing coupling device comprising a body having an internal channel formed therein together with an endpiece of the above-specified type which is fitted inside a section of the internal channel.

BRIEF DESCRIPTION OF THE DRAWINGS

Other characteristics and advantages of the invention appear on reading the following description of a particular, non-limiting embodiment of the invention.

Reference is made to the accompanying drawings, in which.

DETAILED DESCRIPTION OF THE INVENTION

Figure 1:
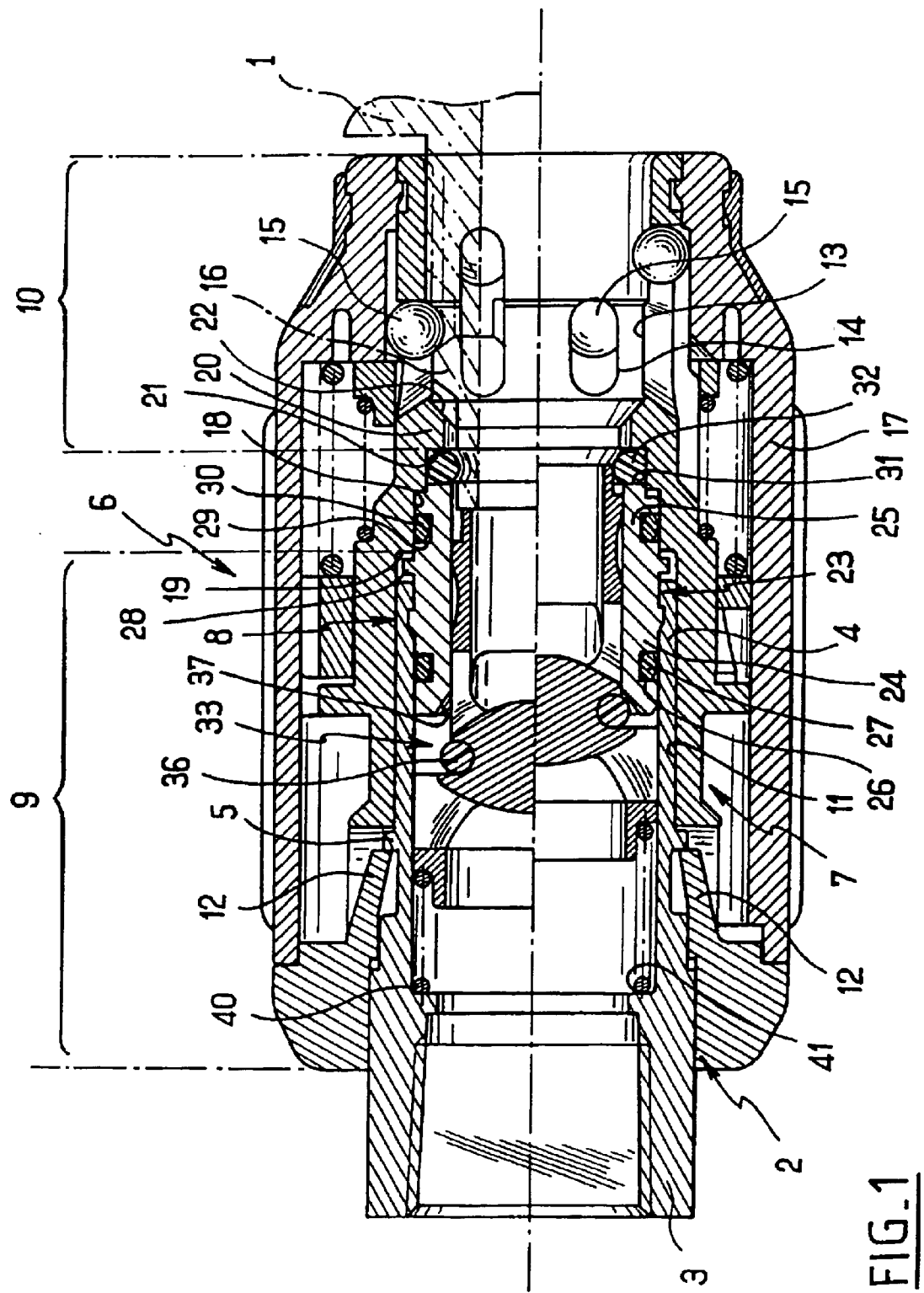
FIG. 1 is a longitudinal section view of a coupling device in accordance with the invention, the top half-view showing the valve slide in its open position and the bottom half-view showing the valve slide in its closed position.
Figure 2:
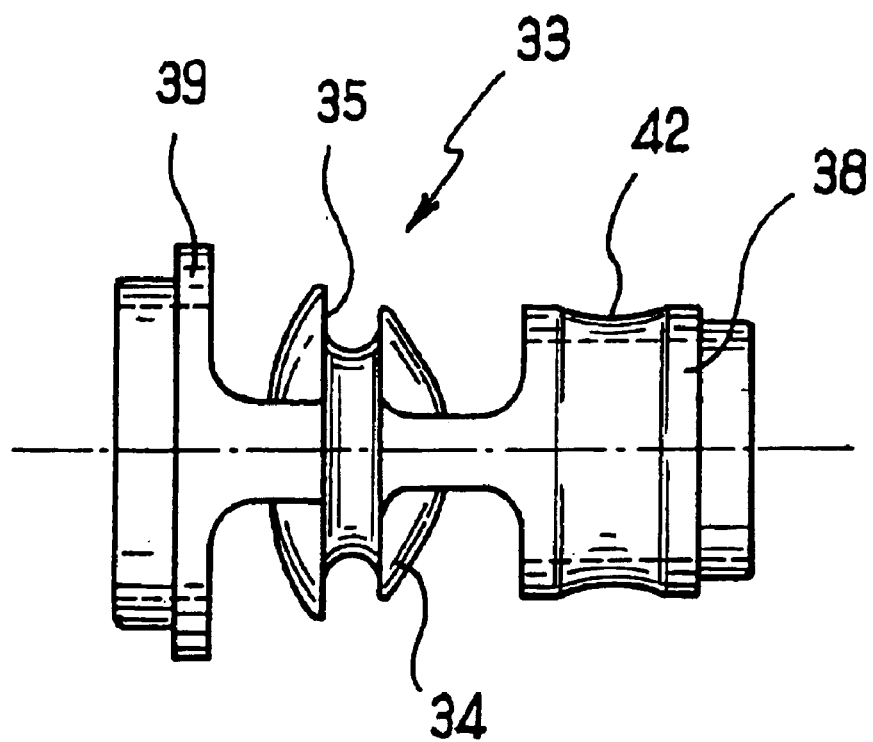
FIG. 2 is an elevation view of the valve slide of the coupling device.

With reference to FIGS. 1 and 2, the coupling device in accordance with the invention is for connecting an endpiece 1 (represented by chain-dotted lines in FIG. 1), e.g. secured to one end of a pipe that is not shown in the figures, to a member such as another pipe, a fluid-emitter member such as a pump, or a fluid-receiver member such as a tank.

Said member is for associating with a tubular endpiece given overall reference 2, the endpiece having a tapped end portion 3 for receiving a corresponding portion of the member, and an opposite end portion 4 fitted in the coupling device given general reference 6. The end portion 3 may be provided with coupling means of some other type, such as quick coupling means, snap-fastening means, . . . . The end portion 4 is provided on the outside with an annular rib 5 for co-operating with means for retaining the coupling device.

The coupling device 6 comprises a tubular body given overall reference 7 which defines an internal channel given overall reference 8 that is subdivided axially into a section 9 for connection to the member and a section 10 for connection to the endpiece 1. The sections 9 and 10 are disposed respectively upstream and downstream relative to the direction in which fluid flows through the coupling device.

The section 9 includes an end bore 11 which receives the endpiece 2 and which includes means for retaining the endpiece 2. These retaining means can be seen in FIG. 1 and comprise resilient tabs 12 deformable between a deformed state in which the free end of each resilient tab 12 is clear of the end bore 11 so as to allow the annular rib 5 of the endpiece 2 to pass through during insertion in the tubular body 7, and a rest position in which the free end of each resilient tab 12 projects into the end bore 11 to bear against the rear face of the annular rim 5 and oppose extraction of the endpiece 2. Naturally the retaining means may be of any type suitable for ensuring that the endpiece is held axially in the tubular body 7, for example tapping.

The coupling section 10 is itself known. The coupling section 10 defines an end bore 13 for receiving the endpiece 1. The end bore 13 is provided on the inside with quick coupling means for providing leaktight coupling of the endpiece 1 in the tubular body 7. In this case, these means comprise longitudinal slots 14 receiving balls 15, each movable between a retracted position and a position where it projects into the end bore 13, in which position the balls are designed to project behind an external bead 16 on the endpiece 1. A locking ring 17 of known type is mounted to turn on the tubular body 7 between a locking position and an unlocking position that are angularly offset relative to each other. For each ball, the locking ring 7 has two housings that are likewise angularly offset relative to each other so as to receive the corresponding ball in each of its two positions, which housings are connected together by means of corresponding ramps for guiding the balls between their two positions. Resilient return means for urging the locking ring 17 into its locked position are preferably mounted between the locking ring and the tubular body 7. Since these coupling means are themselves known, they are not described in greater detail herein. Naturally, other coupling means could be used, for example a locking ring movable radially between a locking position in which the ring has a portion of inside circumference projecting into the end bore 13, and an unlocking position in which said portion of inside circumference is taken out from the end bore 13. Claw coupling means could also be used.

The end bores 11 and 13 are connected together via an intermediate chamber 18 connected to the end bores respectively via a shoulder 19 and an annular rib 20 defining an upstream shoulder 21 and a downstream shoulder 22. The downstream shoulder 22 is for co-operating with the outer annular bead 16 to form an abutment against penetration of the endpiece 1 into the tubular body 7.

The coupling device is a self-closing device comprising a valve slide mounted to slide relative to a valve seat between a closed position in which the valve slide is pressed in leaktight manner against the valve seat, and an open position in which the valve slide is spaced apart from the valve seat so as to define a passage for the fluid.

The valve slide, which is described below, is associated with a guide sleeve given overall reference 23, which sleeve is mounted in the end portion 4 of the endpiece 2.

The guide sleeve 23 comprises an upstream end portion 24 and a downstream end portion 25.

The upstream end portion 24 is received in the end portion 4 of the endpiece 2 and is provided on the outside with a groove 26 receiving an annular sealing ring 27 in close contact with the inside surface of the endpiece 2, and means for snap-fastening the guide sleeve 23 in the endpiece 2. In this case, the snap-fastening means are constituted by studs projecting from the outside surface of the upstream end portion 24 and co-operating with corresponding recesses in the inside surface of the endpiece 2. The guide sleeve can be secured in the endpiece 2 by any means suitable for ensuring that the guide sleeve is prevented from moving axially.

The downstream end portion 25 projects from the end portion 4 of the endpiece 2 and is received in the intermediate bore 18. The downstream end portion 25 is provided on the outside with an annular rib 28 which extends between the terminal face of the end portion 4 of the endpiece 2 and the upstream shoulder 19 so as to form an abutment against insertion of the guide sleeve 23 into the end portion 4, and a groove 29 which receives an annular sealing ring 30 in close contact with the inside surface of the intermediate bore 18. The terminal face 31 of this downstream end portion 25 co-operates with the upstream shoulder 21 of the annular rib 20 to define a housing that receives a sealing ring 32 of inside diameter smaller than the outside diameter of the endpiece 1.

The valve slide given overall reference 33 comprises a shutter portion 34 mounted in the endpiece 2 upstream from the guide sleeve 23 and provided with an outer groove 35 receiving a sealing ring 36 which projects from said groove to come into close contact with a concave frustoconical surface 37 of the upstream end portion 24 of the guide sleeve 23 when the valve slide 33 is in its closed position. The concave frustoconical surface 37 thus forms the seat for the valve slide 33. It should be observed that the upstream flank of the outer groove 35 projects beyond the inner half of the sealing ring 36, in particular for the purpose of holding the sealing ring 36 firmly against the valve seat when the valve slide 33 is in its closed position, preventing the sealing ring from escaping from the groove.

The shutter 34 is extended downstream by a perforated tubular tail 38 which is slidably received in the guide sleeve 23 so as to project beyond it in order to co-operate with a terminal face of the endpiece 1 in such a manner that when the endpiece 1 is inserted into the tubular body 7, the endpiece 1 brings the valve slide 33 into its open position. It should be observed that the tail 38 is provided with an outer groove 42 which subdivides the outside surface of the tail into two bearing surfaces that are spaced apart so as to limit friction while nevertheless retaining a considerable guide length. The groove may also be used to receive marking in relief.

The shutter 34 is associated on the upstream side with a ring 39 mounted to slide in the endpiece 2 and to form a shoulder bearing against one end of a spring 40 whose opposite end bears against an internal shoulder 41 of the endpiece 2.

Thus, the endpiece 2, the valve slide 33, the spring 40, the guide sleeve 23, and the associated elements form a subassembly which can be assembled together prior to being inserted in the body. This makes it easier to assemble the coupling device of the invention.

Naturally, the invention is not limited to the embodiment described and variant embodiments can be applied thereto without going beyond the ambit of the invention as defined by the claims.

In particular, the invention may also be made by inverting the moving parts of the structure of the embodiment described.

Furthermore, the endpiece of the invention is applicable to any type of coupling device.

What is claimed is:

1. A tubular endpiece for a self-closing coupling device, the endpiece (2) including one end (3) for coupling to a member and being provided on the outside with means (5) for preventing it from moving axially in a housing of the coupling device, and being fitted internally with a valve slide (33) mounted to slide relative to a valve seat (37) between a closed position and an open position, and a spring (40) interposed between an internal shoulder (41) of the endpiece and the valve slide in order to urge the valve slide into its closed position against the valve seat, the valve seat being formed by an internal shoulder (41) of a sleeve (23) fitted in the endpiece and arranged to form a guide sleeve for the valve slide (33) which is extended downstream by a perforated tubular tail (38) slidably received in the sleeve (33).

2. The endpiece according to claim 1, wherein the sleeve (23) is snap-fastened in the endpiece (2).

3. The endpiece according to claim 1, wherein the sleeve (23) includes a portion (25) which projects from an end (4)

of the endpiece (2) opposite from the end (3) for coupling to the member, and which is provided on the outside with a sealing ring (30).

4. The endpiece according to claim 1, wherein the tail (38) is provided with an outer groove (42) subdividing an outside surface of the tail into two spaced-apart bearing surfaces.

5. The endpiece according to claim 1, wherein the upstream end of the valve slide includes a bearing ring (39) for the spring (40).

6. The endpiece according to claim 1, wherein the valve slide (33) being provided with an outer groove (35) receiving a sealing ring (36) which projects from said groove so as to come into close contact with the valve seat (37) when the valve slide is in the closed position.

7. The endpiece according to claim 1, wherein the valve seat (37) is formed by a concave frustoconical surface.

8. A self-closing coupling device comprising a body (7) in which an internal channel (8) is formed, the coupling device including the endpiece (2) according to claim 13 fitted in a section (9) of the internal channel.

9. The coupling device according to claim 8, wherein the endpiece (2) is snap-fastened in the body (7).

10. A tubular endpiece for a self-closing coupling device, the endpiece (2) including one end (3) for coupling to a member and being provided on the outside with means (5) for preventing it from moving axially in a housing of the coupling device, and being fitted internally with a valve slide (33) mounted to slide relative to a valve seat (37) between a closed position and an open position, and a spring (40) interposed between an internal shoulder (41) of the endpiece and the valve slide in order to urge the valve slide into its closed position against the valve seat, the valve slide (33) being provided with an outer groove (35) receiving a sealing ring (36) which projects from said groove so as to come into close contact with the valve seat (37) when the valve slide is in the closed position.

11. The endpiece according to claim 10, wherein the valve seat (37) is formed by a concave frustoconical surface.

12. The endpiece according to claim 10, wherein one of the internal shoulder (41) and the valve seat (37) is secured to a sleeve (23) fitted in the endpiece.

13. The endpiece according to claim 12, wherein the sleeve (23) is snap-fastened in the endpiece (2).

14. The endpiece according to claim 12, wherein the sleeve (23) is arranged to form a guide sleeve for the valve slide (33) and is provided with an internal shoulder (37) forming the valve seat.

15. The endpiece according to claim 14, wherein the sleeve (23) includes a portion (25) which projects from an end (4) of the endpiece (2) opposite from the end (3) for coupling to the member, and which is provided on the outside with a sealing ring (30).

16. The endpiece according to claim 14, wherein the valve slide (33) is extended downstream by a perforated tubular tail (38) slidably received in the sleeve (33).

17. The endpiece according to claim 16, wherein the tail (38) is provided with an outer groove (42) subdividing an outside surface of the tail into two spaced-apart bearing surfaces.

18. The endpiece according to claim 10, wherein the upstream end of the valve slide includes a bearing ring (39) for the spring (40).

19. A self-closing coupling device comprising a body (7) in which an internal channel (8) is formed, the coupling device including the endpiece (2) according to claim 22 fitted in a section (9) of the internal channel.

20. The coupling device according to claim 19, wherein the endpiece (2) is snap-fastened in the body (7).

21. A self-closing coupling device comprising a body (7) in which an internal channel (8) is formed, the coupling device including a tubular endpiece (2) including one end (3) for coupling to a member and being provided on the outside with means for preventing it from moving axially in a housing of the coupling device, and being fitted internally with a valve slide (33) mounted to slide relative to a valve seat (37) between a closed position and an open position, and a spring (40) interposed between an internal shoulder (41) of the endpiece and the valve slide in order to urge the valve slide into its closed position against the valve seat, the endpiece being snap-fastened in a section (9) of the internal channel of the body which comprises resilient tabs (12) deformable between a deformed state in which the resilient tabs have a free end clear of said section of the internal channel, and a rest state in which the free end of the resilient tabs projects into said section of the internal channel to bear against a rear face of an outside annular rim (5) of the endpiece.

* * * * *